United States Patent [19]

Neumann

[11] 4,206,529
[45] Jun. 10, 1980

[54] PAIL AND ACCESSORY TRANSPORT APPARATUS

[76] Inventor: Roger W. Neumann, 4265 Highway H West, Rte. 2, Kewaskum, Wis. 53040

[21] Appl. No.: 39,616

[22] Filed: May 16, 1979

[51] Int. Cl.² .................... A47J 47/18; A47L 17/02
[52] U.S. Cl. ..................................... 15/264; 206/233
[58] Field of Search .............. 15/264; 206/233, 210; 211/45, 16

[56] References Cited

U.S. PATENT DOCUMENTS

| | | | |
|---|---|---|---|
| 1,441,913 | 1/1923 | Darling | 15/264 X |
| 3,050,766 | 8/1962 | Millikin | 15/264 |

Primary Examiner—Edward L. Roberts
Attorney, Agent, or Firm—Ralph G. Hohenfeldt

[57] ABSTRACT

Apparatus for facilitating performances of chores such as cleaning the udders of cows includes a band and a latch for clamping the band on a pail which contains cleaning fluid. A pair of upright members extending from the band and support a disposable towel dispenser above the pail. A handle which is located on top of the dispenser enables carrying the dispenser and pail as a unit.

4 Claims, 1 Drawing Figure

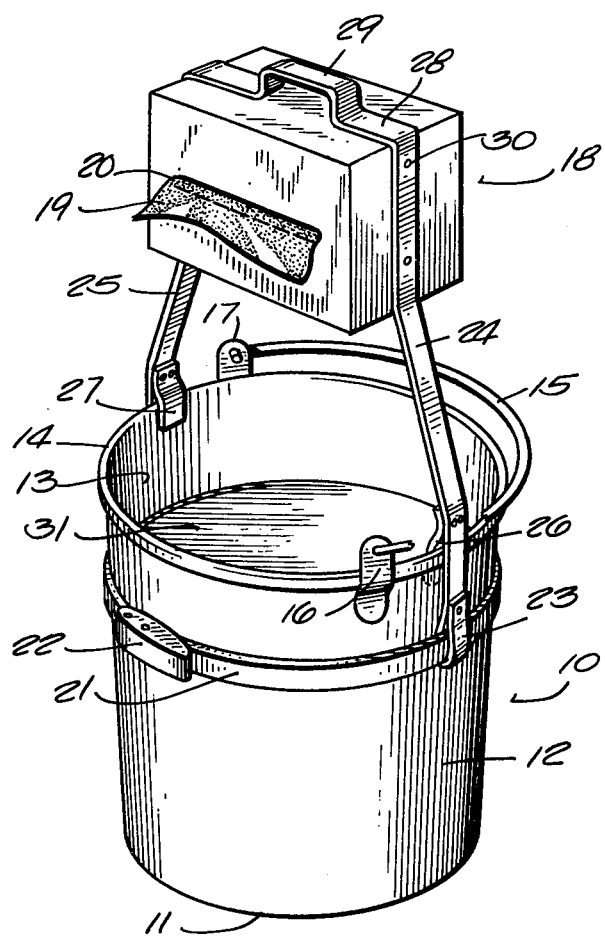

PAIL AND ACCESSORY TRANSPORT APPARATUS

BACKGROUND OF THE INVENTION

This invention relates to apparatus for making various chores easier to perform and is illustrated by apparatus for cleaning the udder of a cow in preparation for attaching the cups of a milking machine to the udder.

To perform the cleaning procedure, the dairyman has customarily placed a pail of disinfectant solution next to the cow and has wetted a cloth with the solution for application to the udder. The customary practice was to use the same cloth and the same towel for cleaning the udders of several cows. New sanitary recommendations suggest the udder of a cow to be cleaned and dried with disposable paper towels rather than reuseable cloths. This raised a problem as to where in a dairy barn paper towels could be stored so they would remain sanitary and be conveniently available for use at each milking station. An investigation showed that a product which came closest to meeting the new requirements were large carts such as are used in hotels and hospitals for holding and transporting cleaning equipment. These products, however, are unnecessarily sophisticated for dairy barn use and they are too expensive. Moreover, their designs are not optimized for use in a dairy herd barn. Wheeled carts are difficult to push around the floor of the barn which may be littered to some extent with the materials usually found around the feeding stalls of cows.

SUMMARY OF THE INVENTION

In accordance with the invention, a cow udder cleaning apparatus is provided which overcomes the problems mentioned above and is distinguished by its low cost, simplicity, good sanitary features and transportability. In general terms, the new apparatus comprises a ring or band into which a circular and axially tapered pail fits. A pair of members extend upright from the band and a paper towel dispenser is mounted to the uprights. In the illustrated embodiment, the uprights are formed with a handle portion which is engageable by a hand from above the towel dispenser so as to facilitate carrying the dispenser and pail assembly from cow to cow.

A more detailed description of an illustrative embodiment of the new udder cleaning apparatus will now be set forth in reference to the drawing.

DESCRIPTION OF THE DRAWING

The single drawing is a perspective view of the apparatus.

DESCRIPTION OF A PREFERRED EMBODIMENT

The drawing shows a typical stainless steel pail 10 which is used in the dairy industry. The pail has a circular bottom 11 of a certain diameter and a circularly formed wall 12 connected to the bottom. The wall defines a top opening 13 and at the top edge of the wall there is a formed rim 14 for stiffening the pail and for avoiding sharp edges. The customary wire handle 15, which is pivotally connected to diametrically opposite upstanding tongues 16 and 17 may remain on the pail or may be omitted from the pail insofar as the objectives of the invention are concerned.

The new cleaning apparatus provides for supporting a disposable towel dispenser cabinet 18 above the top of the pail to facilitate withdrawing individual disposable towels 19, usually absorbent paper, from a slot 20 in the front wall of the cabinet. Although the rear wall of cabinet 18 is not visible, it will be understood that this wall may be removable or hinged so it can be opened to insert a stack of disposable towels in the dispenser.

Towel dispenser 18 is mounted to the pail 10 with an annular ring which may be a relatively flexible metal band or strap. In this example, a metal ring or band 21 is used and it is formed as a loop whose ends are connected by an over-center or toggle type clamping device 22 which, when toggled, draws the strap 21 tightly around the body or wall of the pail. Other kinds of clamping devices could be used. Band 21 is attached to the lower ends of a pair of upwardly extending members 24 and 25 by either bolting or a weldment. Each upright member 24 and 25 has a stop hook 26 or 27, respectively, permanently fastened to it and overhanging the rim 14 of the pail so that the upright members cannot slide downwardly on the pail even if band 21 were not tight.

In this embodiment, upright members 24 and 25 are comprised of metal bar stock and are continuous with a cross-over member 28 that is provided with an offset portion 29 which serves as a handle. Disposable towel dispenser 18 is fitted between the upright members and is secured to these members with any suitable fastening devices such as the rivet marked 30.

In the illustrated embodiment, upright members 24 and 25 are diametrically opposite each other and are centered with respect to the circular band 21 and the pail so that the whole assembly remains in balance when it is being carried from place to place by the dairyman grasping handle 29. In this embodiment, the weight of the pail is imposed on upright members 24 and 25 and unitary handle 29 but it will be understood that the upright members could be separate or individualized and the handle could be fastened directly to the top of the towel dispenser 18.

Use of the new cleaning apparatus is simple and convenient. A clean pail 10 may be filled with udder disinfectant solution and the dispenser cabinet 18 may be filled with disposable paper towels at any suitable location either before or after the band 21 and the dispenser 18 which it supports are mounted to the pail. Handle 29 may then be grasped for carrying the dispenser and pail combination to the location of one of the cows which is to be prepared for milking. Washing and drying the udders may be done with one or more individual towels in each ease. When a selected number of cows have been treated, the solution can be easily spilled out of the pail and the solution can be replenished if desired while the dispenser remains attached to the pail.

Although a paper towel dispenser has been used to illustrate one kind of accessory that be used in combination with a pail and pail carrier, it should be apparent that other accessories could be substituted or added as well. A roll toweling dispenser might be substituted for the individual towel sheet dispenser. A box for tools and instruments could be mounted from the uprights or even on the dispenser cabinet. A shelf for carrying such items as brushes, medications, cleaning agents and so forth could be easily affiliated with the device.

Although a preferred embodiment of the new udder cleaning apparatus has been described in detail, such description is intended to be illustrative rather than limiting, for the apparatus may be variously embodied and is to be limited only by interpretation of the claims which follow.

I claim:

1. Towel holding apparatus characterized by facilitating the dual functions of dispensing disposable towels and enabling carrying of a pail, comprising:
    a band for being formed into a loop,
    a coupling device operative to clamp said band around the external surface of said pail,
    a pair of members connected to said band for extending generally upwardly from it and to above the top opening of said pail, and
    a towel dispenser supported on said members at a place which will locate said dispenser above said pail when said band loop is clamped on said pail.

2. The invention defined in claim 1 including stop means for projecting from said members, respectively, over and inwardly of the top of the pail to prohibit said apparatus from sliding downwardly on said pail.

3. The invention defined in any one of claim 1 or 2 including a handle fastened to said apparatus at a place which makes it accessible for being grasped by a hand to thereby facilitate carrying said apparatus and pail from place to place.

4. Udder cleaning apparatus characterized by facilitating the dual functions of dispensing disposable towels and enabling carrying of a pail which has a closed bottom, an open top and an annular wall connected to the bottom and whose diameter increases axially from a minimum diameter near the bottom to a maximum diameter near the top and a radially outwardly extending rim on the top edge of the wall, said apparatus comprising:
    a circular loop for surrounding the wall of said pail, said loop having an inside diameter less than the maximum outside diameter of the pail so said pail will not pass through the loop,
    a pair of members connected to said loop for extending generally upwardly to above the top opening of said pail,
    a disposable towel dispenser mounted on said members at a place which will locate said dispenser above the top of the pail, and
    a handle fastened to said apparatus at a place which makes it accessible for being grasped by a hand from above said apparatus to thereby facilitate carrying said apparatus and pail from place to place.

* * * * *